United States Patent
Zhang et al.

(10) Patent No.: US 9,830,076 B2
(45) Date of Patent: Nov. 28, 2017

(54) APPARATUS AND ASSOCIATED METHODS

(71) Applicant: Nokia Technologies Oy, Espoo (FI)

(72) Inventors: Liang Zhang, Beijing (CN); Shijun Yuan, Beijing (CN)

(73) Assignee: Nokia Technologies Oy, Espoo (FI)

( * ) Notice: Subject to any disclaimer, the term of this patent is extended or adjusted under 35 U.S.C. 154(b) by 2 days.

(21) Appl. No.: 14/778,962

(22) PCT Filed: Mar. 28, 2013

(86) PCT No.: PCT/CN2013/073324
§ 371 (c)(1),
(2) Date: Sep. 21, 2015

(87) PCT Pub. No.: WO2014/153749
PCT Pub. Date: Oct. 2, 2014

(65) Prior Publication Data
US 2016/0048290 A1    Feb. 18, 2016

(51) Int. Cl.
*G06F 3/0489* (2013.01)
*G06F 3/0488* (2013.01)
*G06F 1/32* (2006.01)
*G06F 3/044* (2006.01)

(52) U.S. Cl.
CPC .......... *G06F 3/0489* (2013.01); *G06F 1/3262* (2013.01); *G06F 3/044* (2013.01); *G06F 3/0488* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 2005/0116840 A1* | 6/2005 | Simelius | H04M 1/67 341/22 |
| 2013/0111415 A1* | 5/2013 | Newman | G06F 1/3203 715/864 |

FOREIGN PATENT DOCUMENTS

| | | |
|---|---|---|
| CN | 1855011 A | 11/2006 |
| CN | 102135834 A | 7/2011 |

OTHER PUBLICATIONS

International Search Report and Written Opinion received for corresponding Patent Cooperation Treaty Application No. PCT/CN2013/073324, dated Jan. 9, 2014, 9 pages.

* cited by examiner

*Primary Examiner* — Kenneth B. Lee, Jr.
(74) *Attorney, Agent, or Firm* — Alston & Bird LLP

(57) ABSTRACT

An apparatus, the apparatus comprising at least one processor, and at least one memory including computer program code, the at least one memory and the computer program code configured, with the at least one processor, to cause the apparatus to perform at least the following: change the state of a touch-sensitive input layer from a non-detecting state to a detecting state based on detection of a user input made using a user interface of an electronic device, the user interface comprising the touch-sensitive input layer and a physical key layer wherein the respective layers are at least partly overlying and the detection of the user input comprises detection of actuation using the physical key layer.

20 Claims, 7 Drawing Sheets

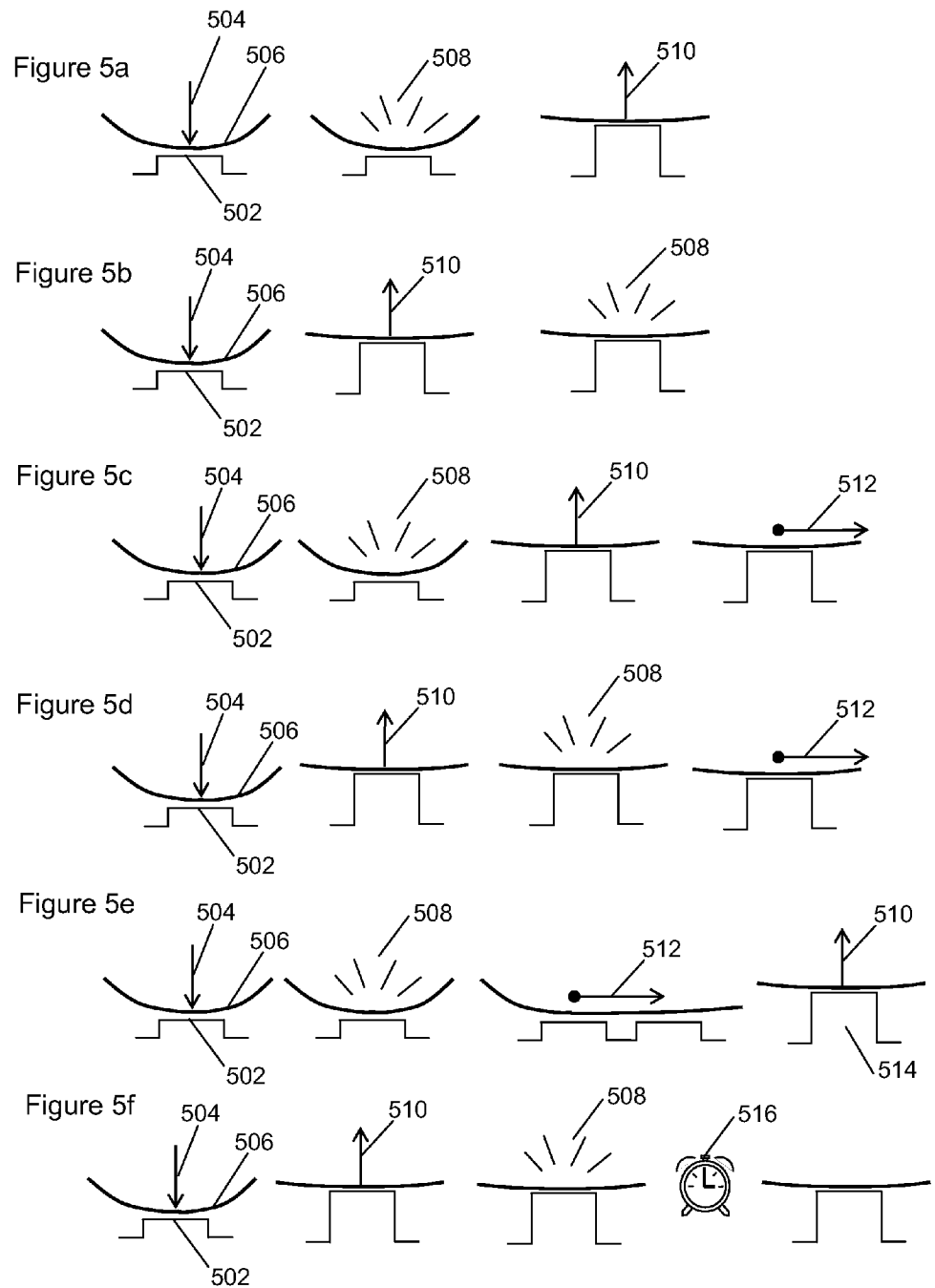

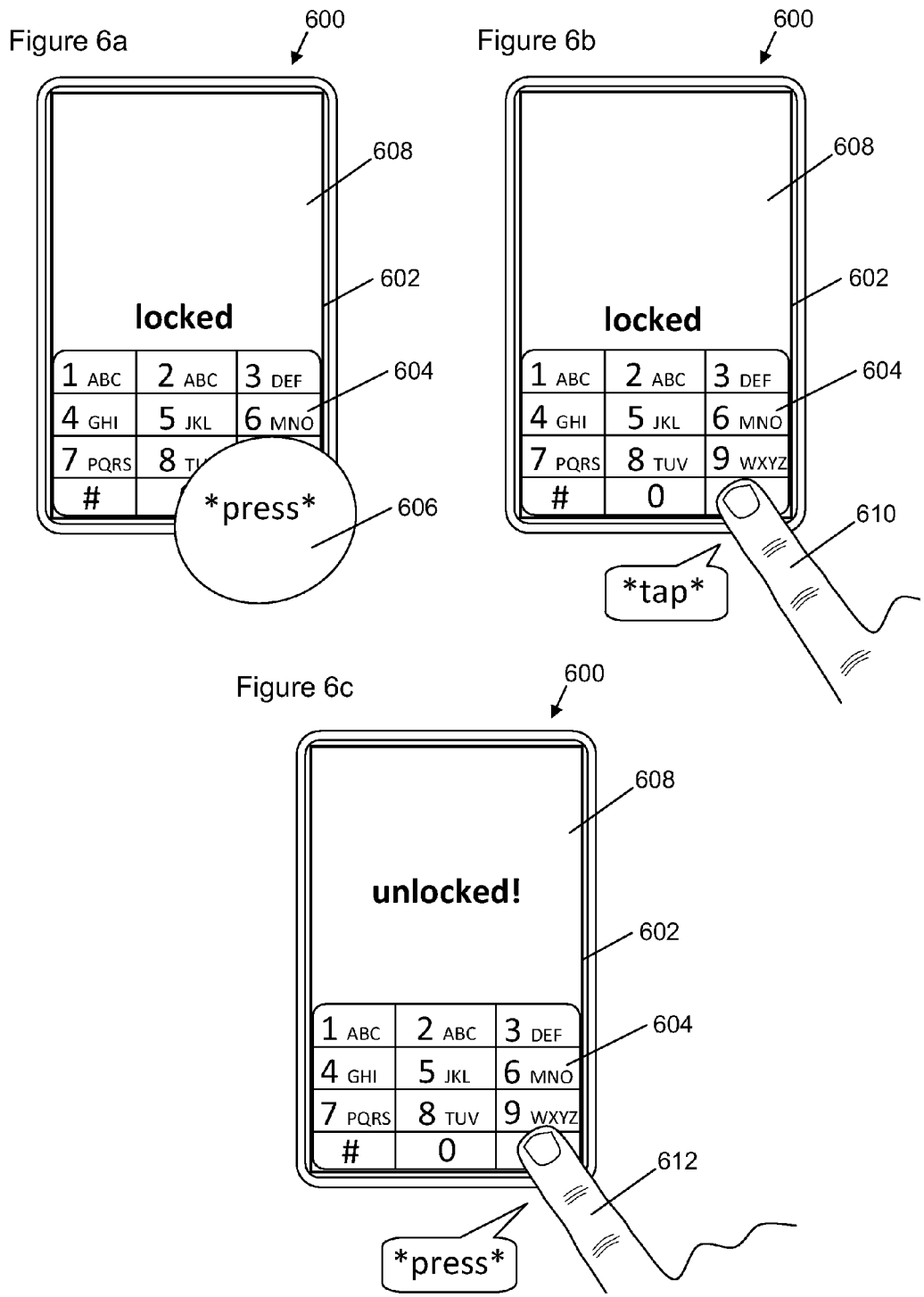

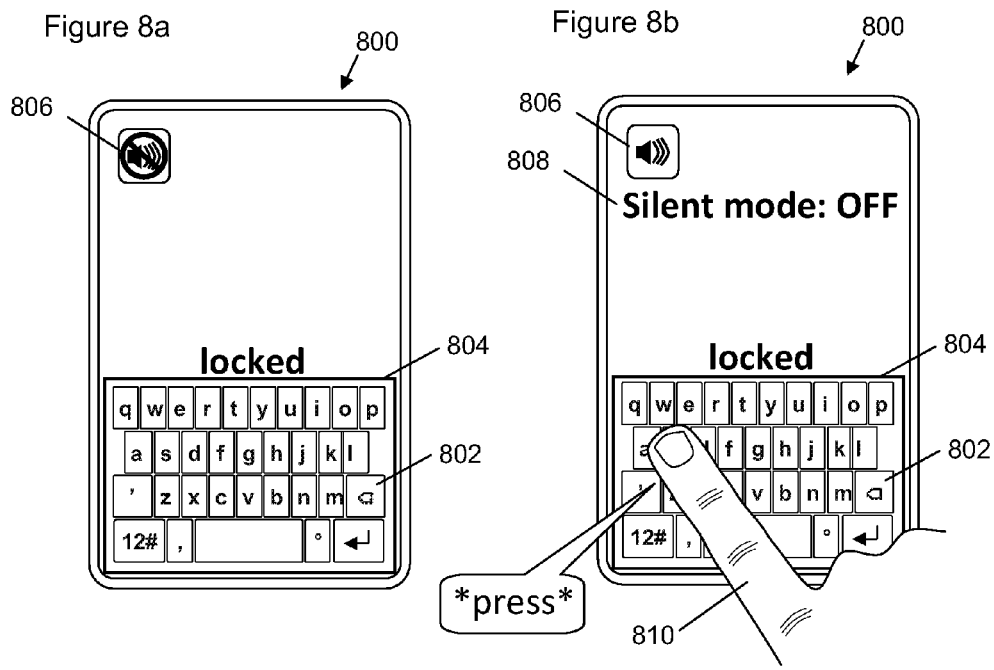
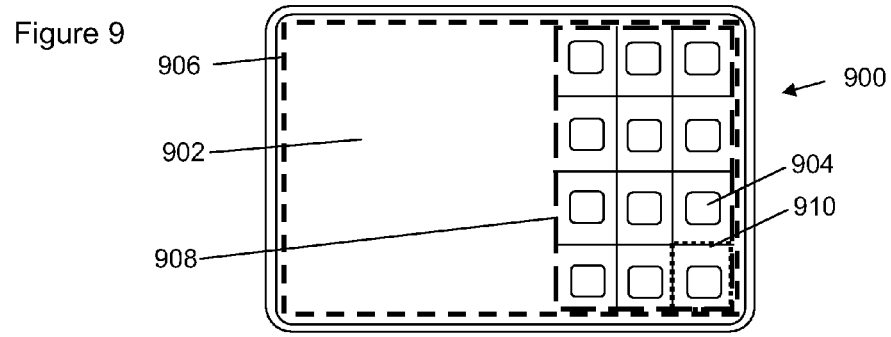

Figure 10a

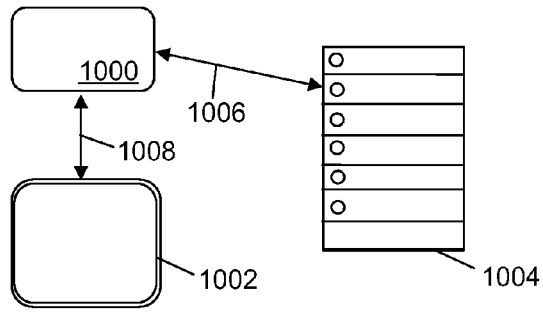

Figure 10b

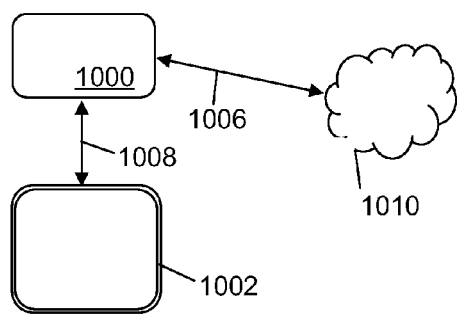

Figure 11

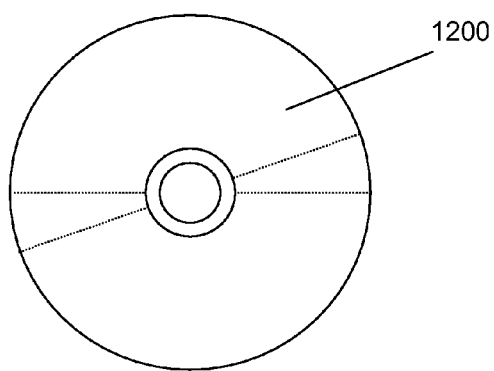

1100

Changing the state of a touch-sensitive input layer from a non-detecting state to a detecting state based on detection of a user input made using a user interface of an electronic device, the user interface comprising the touch-sensitive input layer and a physical key layer wherein the respective layers at least partly overlying, and the detection of the user input comprises detection of actuation using the physical key layer.

APPARATUS AND ASSOCIATED METHODS

RELATED APPLICATION

This application was originally filed as Patent Cooperation Treaty Application No. PCT/CN2013/073324 filed Mar. 28, 2013.

TECHNICAL FIELD

The present disclosure relates to user interfaces, associated methods, computer programs and apparatus. Certain disclosed embodiments may relate to portable electronic devices, for example so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed embodiments may provide one or more audio/text/video communication functions (e.g. telecommunication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Many electronic devices allow input to be made via one or more physical keys. Many electronic devices allow input to be made via a touch sensor, such as a touch-sensitive display screen. Certain electronic devices allow input to be made via both physical keys and a touch sensor.

The listing or discussion of a prior-published document or any background in this specification should not necessarily be taken as an acknowledgement that the document or background is part of the state of the art or is common general knowledge. One or more embodiments of the present disclosure may or may not address one or more of the background issues.

SUMMARY

In a first example embodiment there is provided an apparatus comprising at least one processor and at least one memory including computer program code, the at least one memory and the computer program code configured to, with the at least one processor, cause the apparatus to perform at least the following: change the state of a touch-sensitive input layer from a non-detecting state to a detecting state based on detection of a user input made using a user interface of an electronic device, the user interface comprising the touch-sensitive input layer and a physical key layer wherein the respective layers are at least partly overlying, and the detection of the user input comprises detection of actuation using the physical key layer.

The user interface of the electronic device comprises a touch-sensitive input layer and a physical key layer wherein the respective layers are at least partly overlying. The touch-sensitive input layer may at least partly overlie the physical key layer, or the physical key layer may at least partly overlie the touch-sensitive input layer. For example, a device/apparatus may have a display screen with an adjacent physical keypad in substantially the same plane. In this case, a touch-sensitive input layer may cover (e.g., overlie on top of) both the display screen and the physical keypad. As another example, a device may comprise a physical keypad with a touch-sensitive input layer underneath, such that when a user depresses a physical key, the user's finger also provides an input to the underlying touch-sensitive physical layer.

When the touch-sensitive input layer is in a non-detecting state, limited or even no power needs to be supplied to the layer. A user may actuate a physical key of the physical key layer. Upon this actuation, the touch-sensitive input layer is activated (powered-up). If the user accidentally actuates the physical key layer by, for example, inadvertently pushing on it with other articles while the device is in a pocket or bag, then the touch-sensitive input layer will be activated, but no touch user input will be detected since only a physical key actuation rather than a touch actuation would cause a touch input to be detected. For example, human skin contact may cause a touch user input to be detected, but contact from the fabric of a bag or pocket may not. In this way the apparatus advantageously ensures that accidental/inadvertent inputs are much less likely to be considered as inputs. Similarly, if the user accidentally touches the touch-sensitive input layer with a finger, for example by holding the device and touching the touch-sensitive input layer, then no input would be provided to the device since the touch-sensitive input layer has not yet been activated by a physical key actuation being detected.

Thus the apparatus may advantageously allow for a much reduced risk of making accidental inputs (e.g., locking out certain inputs), which may be frustrating and in certain cases, expensive (for example, if a call is accidentally made and the user does not realise he may be charged for the call). Power saving is also provided by regulating the periods when the touch-sensitive input layer is activated to detect touch input.

The touch-sensitive input layer may be configured to be responsive to skin contact or capacitive contact. For example, the touch-sensitive input layer may be configured to detect the contact of human skin, a stylus configured for capacitive contact, and a glove configured for capacitive contact (such as a glove with embedded conducting fibres allowing a touch-sensitive input layer to be used by a user wearing the gloves). The touch-sensitive input layer may be configured to be unresponsive to non-skin and non-capacitive contact, such as contact with non-conductive fabrics, wooden and plastic surfaces, for example.

The touch-sensitive input layer may be a capacitive touch-sensitive input layer. The touch-sensitive layer may be configured to allow for the detection of touch input by one or more of physical touch and hover touch. The touch-sensitive input layer may comprise one or more of: a touch-sensitive panel; a hover-sensitive panel; a capacitive touch-sensitive panel; and a capacitive hover-sensitive panel.

The apparatus may be configured to switch the touch-sensitive input layer into the non-detecting state if a skin or capacitive contact is not subsequently detected after a predetermined time following the detection of the physical key layer user input. Therefore advantageously, the apparatus may allow for improved power saving by firstly not supplying power (or supplying reduced power) to the touch-sensitive input layer when not in use. Secondly, power saving is achieved by stopping (or reducing) the supply of power to an accidentally activated touch-sensitive input layer by switching the touch-sensitive input layer into a non-detecting state (and therefore no longer (or reducing) supplying power to it) if no skin or capacitive contact (i.e., an intentional user interaction) is subsequently detected after a predetermined time following the touch-sensitive input layer activation by a physical key actuation.

A particular physical key layer user input may be associated with the performance of a particular function by the electronic device, and the apparatus may be configured to enable the particular function of the electronic device to be performed based on the subsequent detection of a particular touch user input from the touch-sensitive input layer when in the detecting state.

The detection of the user input may comprise detection of actuation of a particular physical key of the physical key layer, the particular physical key associated with enabling a particular function of the electronic device to be performed, and the apparatus may be configured to enable the particular function associated with the particular physical key to be performed if skin or capacitive contact is subsequently detected using the touch-sensitive input layer in the detecting state.

Therefore advantageously, the user may still be able to readily access particular functions (which may be shortcut functions) of the device while still making use of the locked, limited detection, or lower power consumption state. This may be useful, for example, if the device is being used as a media player (but has other functionality such as telephone calling, messaging, and internet access capability which is not available in the locked/limited detection/low power consumption state). The user may be able to access media control functions such as play, pause, fast forward and rewind, by actuating a particular physical key associated with a particular function and providing a touch input. The touch input may be provided by the user pressing a physical key with a finger, since the finger would also make physical contact which would provide a touch user input which would be detectable by the activated touch-sensitive input layer.

A particular touch input may be associated with the performance of a particular function by the electronic device, and the apparatus may be configured to enable the particular function of the electronic device to be performed based on the subsequent detection of the particular touch user input from the touch-sensitive input layer when in the detecting state.

Therefore advantageously, the user may still be able to readily access particular functions (which may be shortcut functions) of the device while still making use of the locked, limited detection, or lower power consumption state by providing a particular touch user input. For example, the user may be able to toggle between certain event alerts by actuating any physical key (to activate the touch-sensitive input layer) and then provide a particular touch user input. For example, the user could press any key and activate the touch-sensitive input layer. The user may then slide his finger to the left to toggle vibration on or off, and slide his finger to the right to toggle audio alerts on and off. Thus navigation to a particular settings menu or similar to make the toggling input is not required to activate the vibration/audio functionality with such shortcuts.

A particular combination of physical key layer user input and touch user input may be associated with performance of a particular function, and the apparatus may be configured to enable the particular function of the electronic device to be performed based on the detection of the particular combination of physical key user input and the subsequent touch user input using the touch-sensitive input layer when in the detecting state. For example, the user may be able to actuate a key associated with selecting SIM card 1 (for example, the "1" key) and make a touch user input sliding down to de-select that particular SIM card, or make a touch user input sliding up to select that card.

The subsequent detection of the touch user input using the touch-sensitive input layer when in the detecting state may enable the performance of a particular function by the electronic device, and the particular function may be changing the state of the electronic device from a locked state to an unlocked state.

The subsequent detection of the skin contact or capacitive contact as the touch user input using the touch-sensitive input layer when in the detecting state may enable the performance of a particular function by the electronic device, and the particular function may be changing the state of the electronic device from a locked state to an unlocked state.

As mentioned above, the user may unlock the electronic device by providing a physical key actuation and a touch user input. This may be pressing a particular unlock key, and the user touch associated with pressing the key is also detected when the overlying/underlying touch-sensitive input layer is activated. As another example, device unlocking may be performed by the user pressing a key which the user has pre-assigned with the unlock function (which also causes the overlying/underlying touch-sensitive input layer to be activated), followed by tracing a particular shape on the now-activated touch-sensitive input layer. In such examples, the user may advantageously consider access to his electronic device to be more secure as the particular user combination of physical key actuation and touch user input may be considered a type of passcode to access the device.

In the locked state, the set of locked functions may be limited with respect to the set of unlocked functions available to the electronic device in an unlocked state. For example, with regard to a movie player application, in the locked state the user may also be able to skip forward or backwards through scenes, and stop the movie playback, but there may be a limit to the functionality available in the locked mode. When the device is unlocked, extra functionality may be available such as fast forward, rewind, changing sound settings and changing movie, for example.

The subsequent detection of the touch user input using the touch-sensitive input layer when in the detecting state may enable the performance of a particular function by the electronic device, and the particular function may be enabling selection of a particular network service card. In other examples, the particular function may be enabling toggling through event alerts types. An event may be, for example, receiving/sending a message, e-mail or telephone call, a battery power level being detected as low, or fully charged, or a notification of change of network provider. An event alert type may be, for example, vibration (which may be toggled on and off), sound (which may be toggled on, through different volume levels, and off), a light indicator (which may be toggled on and off) and a silent mode (which may be toggled on and off). In other examples still, the particular function may be enabling toggling of properties of one or more input and/or output devices. For example, a camera may be toggled on and off; a speaker may be toggled on, through different volume levels, and off; and a microphone may be toggled on and off. In further examples, the particular function may be enabling provision of input commands to a media player. Such input commands may be, for example, volume controls, play, rewind, fast forward, pause, skip track, skip album, shuffle on/off, and repeat on/off.

The subsequent detection of the touch user input using the touch-sensitive input layer when in the detecting state may enable the performance of a particular function by the electronic device in the locked state, and the subsequent detection of the touch user input using the touch-sensitive input layer when in the detecting state may enable the performance of a particular function by the electronic device in the unlocked state. The particular functions may be, for example, enabling selection of a particular network service card, enabling toggling through event alerts types, enabling toggling of properties of one or more input and/or output devices, and/or enabling provision of input commands to a media player.

The apparatus may be configured to change the state of the touch-sensitive input layer from a non-detecting state to a detecting state at one or more of:
  the location of the detected user input;
    the neighbouring proximity of the location of the detected user input; and
    a region across the entire touch-sensitive input layer.

The two former cases may advantageously improve power saving by activating a part of the touch-sensitive input layer for touch user input without necessarily activating the entire touch-sensitive input layer.

Actuation of the physical key layer may comprise depression of a physical key of the physical key layer and release of a physical key of the physical key layer, and the apparatus may be configured to change the state of the touch-sensitive input layer from a non-detecting state to a detecting state after depression and release of the physical key of the physical key layer. Thus a physical key may be both depressed and released before the touch-sensitive input layer is activated.

The apparatus may be configured to change the state of the touch-sensitive input layer from a non-detecting state to a detecting state after depression of a physical key of the physical key layer and before release of a physical key of the physical key layer. Thus a physical key may be depressed, the touch-sensitive input layer may be activated, and then the physical key may be released.

The touch user input detectable by the touch-sensitive input layer when in the detecting state may comprise one or more of: a tap, a hold, a touch, a press, a slide, a flick, a circle, a shape, a multiple tap, a rub, directional input, and a hover. For example, if the user interface comprises a capacitive sensing layer which can detect both touch and hover user interactions, then a user may be able to press a physical key, release the physical key, and provide a hover user gesture to the newly-activated capacitive sensing layer.

The apparatus may be configured to detect the user input made through the user interface of the electronic device.

The apparatus may comprise the user interface, or may be the user interface, or may be the electronic device, or may be a module/circuitry for one or more of the same.

The electronic device may be a portable electronic device, a mobile phone, a smartphone, a tablet computer, a surface computer, a laptop computer, a personal digital assistant, a graphics tablet, a pen-based computer, a digital camera, a watch, a navigation device, a non-portable electronic device, a desktop computer, a monitor/display, a household appliance, a refrigerator, a cooker, a cooling/heating system, or a server.

According to a further example embodiment, there is provided a computer program comprising computer program code, the computer program code being configured to perform at least the following:
  change the state of a touch-sensitive input layer from a non-detecting state to a detecting state based on detection of a user input made using a user interface of an electronic device, the user interface comprising the touch-sensitive input layer and a physical key layer wherein the respective layers are at least partly overlying, and the detection of the user input comprises detection of actuation using the physical key layer.

According to a further example embodiment, there is provided a method, the method comprising:
  changing the state of a touch-sensitive input layer from a non-detecting state to a detecting state based on detection of a user input made using a user interface of an electronic device, the user interface comprising the touch-sensitive input layer and a physical key layer wherein the respective layers are at least partly overlying, and the detection of the user input comprises detection of actuation using the physical key layer.

According to a further example embodiment there is provided an apparatus comprising: means for changing the state of a touch-sensitive input layer from a non-detecting state to a detecting state based on detection of a user input made using a user interface of an electronic device, the user interface comprising the touch-sensitive input layer and a physical key layer wherein the respective layers are at least partly overlying, and the detection of the user input comprises detection of actuation using the physical key layer.

The present disclosure includes one or more corresponding aspects, embodiments or features in isolation or in various combinations whether or not specifically stated (including claimed) in that combination or in isolation. Corresponding means and corresponding function units (e.g. touch-sensitive input layer state changer, user input detector, touch user input detector, physical key actuation detector, function enabler, skin/capacitive contact detector) for performing one or more of the discussed functions are also within the present disclosure.

A computer program may be stored on a storage media (e.g. on a CD, a DVD, a memory stick or other non-transitory medium). A computer program may be configured to run on a device or apparatus as an application. An application may be run by a device or apparatus via an operating system. A computer program may form part of a computer program product. Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:

FIGS. 5a-5f illustrate combinations of physical key actuation and touch-sensitive input layer activation according to embodiments of the present disclosure;

FIGS. 6a-6c illustrate unlocking an electronic device according to embodiments of the present disclosure;

FIGS. 8a-8b illustrate providing a user input to an electronic device in the locked state according to embodiments of the present disclosure;

FIG. 9 illustrates different regions of a touch-sensitive input layer of an electronic device according to embodiments of the present disclosure;

FIGS. 10a-10b each illustrate an apparatus in communication with a remote computing element;

FIG. 11 illustrates a flowchart according to an example method of the present disclosure; and FIG. 12 illustrates schematically a computer readable medium providing a program.

DESCRIPTION OF EXAMPLE ASPECTS/EMBODIMENTS

Figure 1:
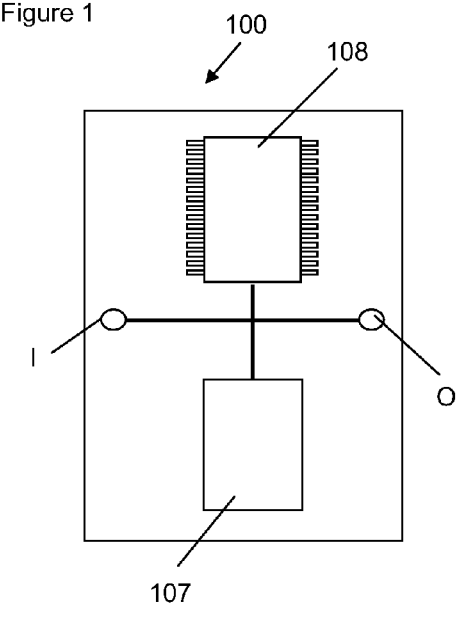
FIG. 1 illustrates an example apparatus embodiment comprising a number of electronic components, including memory and a processor, according to one embodiment of the present disclosure.

Many electronic devices allow input to be made via one or more physical/hardware keys, such as on/off switches, volume keys and alphabetical/numerical keyboards/keypads. Many electronic devices allow input to be made via a touch sensor, such as a touch-sensitive display screen, touch-sensitive sensor layer, or touchpad. Certain electronic devices allow input to be made via both physical keys and a touch sensor. For example, a device may comprise a keypad and a capacitive touch-sensor.

Often an electronic device may be locked. A locked device may only allow certain restricted limited user inputs to be made, for example to unlock the device.

It may be possible for a device to be unlocked by pressing a particular physical key. It may be annoying for a user if he accidentally presses the "unlock" key without meaning to, for example by accidentally applying pressure on the device in his pocket. The device would be unlocked and further accidental inputs may be accidentally made.

It may be possible for a device to be unlocked by performing a particular unlocking touch user input. This may be annoying for a user if he accidentally touches the device and unlocks the device without intending to, for example by brushing his hand over the device while it is resting on a table. If the unlock touch user input also causes another action, such as launching an application or sending/receiving information, this may be annoying for the user who did not wish such other actions to take place.

Disclosed herein is an apparatus configured to change the state of a touch-sensitive input layer from a non-detecting state to a detecting state based on detection of a user input made using a user interface of an electronic device, the user interface comprising the touch-sensitive input layer and a physical key layer wherein the respective layers are at least partly overlying, and the detection of the user input comprises detection of actuation using the physical key layer.

Advantages may be gained for a device/apparatus having a user interface comprising a touch-sensitive input layer and a physical key layer which are at least partly overlying. The touch-sensitive input layer need not be continually active, since the apparatus is configured to move the touch-sensitive input layer state from inactive to active upon detection of a user input using the user interface, thereby saving power. The touch-sensitive input layer is activated by detection of a physical key actuation.

Therefore, advantageously, since a physical key is actuated in order to activate the overlying/underlying touch-sensitive input layer, it is much less likely that a user will accidentally provide touch inputs to the device unintentionally. For example, a touch input is detectable by the touch-sensitive input layer when in an active state. If no physical key press is detected then the touch-sensitive input layer will not be activated and an input cannot accidentally be made merely by touching the touch-sensitive layer without intentionally pressing a physical key.

As another example, if both a physical key press and a touch user input are used to provide an input to the device, for example to lock/unlock it, then the user cannot accidentally lean/press on the physical key layer while the device is in his pocket or bag and accidentally provide the input. While a physical key press may be detected, no touch user input would be provided by the non-conducting fabric of the pocket/bag contacting the touch-sensitive input layer and therefore no accidental user input would take place.

Further advantageously, the device may be configured to allow certain user inputs to be provided while in the locked/limited detection/low power state. For example, using both a physical key press and a touch user inputs to the touch-sensitive input layer, certain limited inputs may be provided. These inputs may be considered shortcuts to particular functionality of the device. Since the touch-sensitive input layer is activated by detection of a physical key press, and since the physical key layer and touch-sensitive input later are at least partially overlapping, then a user can press a physical key and due to the key press/actuation, the touch-sensitive input layer will be activated and detect the user's physical key press also as a touch user input. The detection of both physical key presses and touch user inputs, for example in relation to a particular key, may cause a particular input such as providing a "pause" command while the electronic device is functioning as a music player. Such commands are unlikely to be accidentally provided by the user leaning on the device (thereby only providing a physical key press) or by accidentally brushing his hand/finger over the touch-sensitive input panel (thereby touching the touch-sensitive input layer which has not yet been activated by a physical key press/actuation), A user is therefore provided with the flexibility to use particular functionality of his electronic device while minimising the risk of accidentally making an unintentional user input or accidentally unlocking/locking the device.

Further advantageously, a user may be able to pre-define a combination of a particular physical key actuation and particular touch user input as a type of passcode which would cause the device to be unlocked. This may provide an intuitive and secure way for the user to lock and unlock his device.

Other embodiments depicted in the figures have been provided with reference numerals that correspond to similar features of earlier described embodiments. For example, feature number 100 can also correspond to numbers 200, 300 etc. These numbered features may appear in the figures but may not have been directly referred to within the description of these particular embodiments. These have still been provided in the figures to aid understanding of the further embodiments, particularly in relation to the features of similar earlier described embodiments.

FIG. 1 shows an apparatus 100 comprising memory 107, a processor 108, input I and output O. In this embodiment only one processor and one memory are shown but it will be appreciated that other embodiments may utilise more than one processor and/or more than one memory (e.g. same or different processor/memory types).

In this embodiment the apparatus 100 is an Application Specific Integrated Circuit (ASIC) for a portable electronic device with a touch-sensitive display. In other embodiments the apparatus 100 can be a module for such a device, or may be the device itself, wherein the processor 108 is a general purpose CPU of the device and the memory 107 is general purpose memory comprised by the device. The display, in other embodiments, may not be touch-sensitive.

The input I allows for receipt of signalling to the apparatus 100 from further components, such as components of a portable electronic device (like a touch-sensitive or hover-sensitive layer) or the like. The output O allows for onward provision of signalling from within the apparatus 100 to further components such as a display screen, speaker, or vibration module. In this embodiment the input I and output O are part of a connection bus that allows for connection of the apparatus 100 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
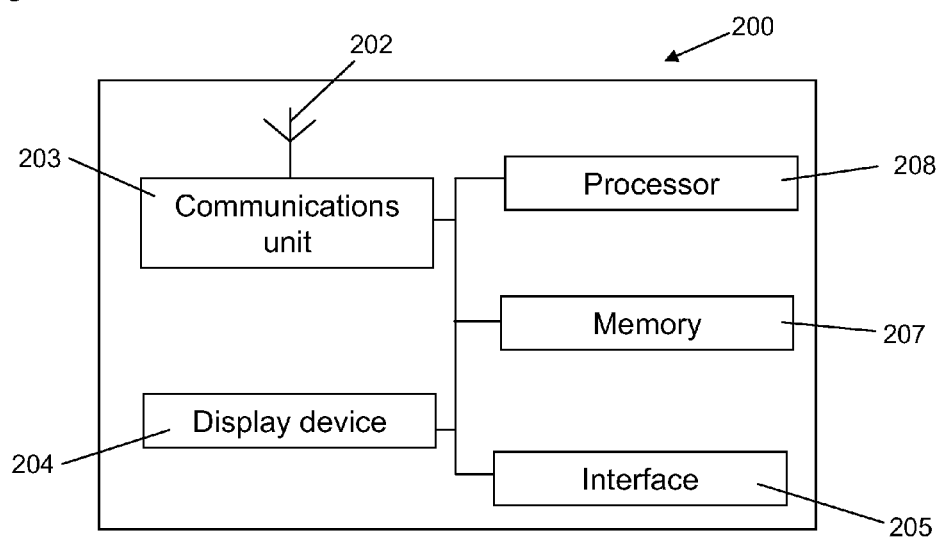
FIG. 2 illustrates an example apparatus embodiment comprising a number of electronic components, including memory, a processor and a communication unit, according to another embodiment of the present disclosure.

FIG. 2 depicts an apparatus 200 of a further example embodiment, such as a mobile phone. In other example embodiments, the apparatus 200 may comprise a module for a mobile phone (or PDA or audio/video player), and may just comprise a suitably configured memory 207 and processor 208. Although the user interface 205 and display device 204 are shown separately, they could be combined in other embodiments.

The example embodiment of FIG. 2 comprises a display device 204 such as, for example, a liquid crystal display (LCD), e-Ink or touch-screen user interface. The apparatus 200 of FIG. 2 is configured such that it may receive, include, and/or otherwise access data. For example, this example embodiment 200 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 207 that stores data, possibly after being received via antenna 202 or port or after being generated at the user interface 205 (comprising both respective touch-sensitive and physical input layers). The processor 208 may receive data from the user interface 205, from the memory 207, or from the communication unit 203. It will be appreciated that, in certain example embodiments, the display device 204 may incorporate the user interface 205. Regardless of the origin of the data, these data may be outputted to a user of apparatus 200 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

Figure 3:
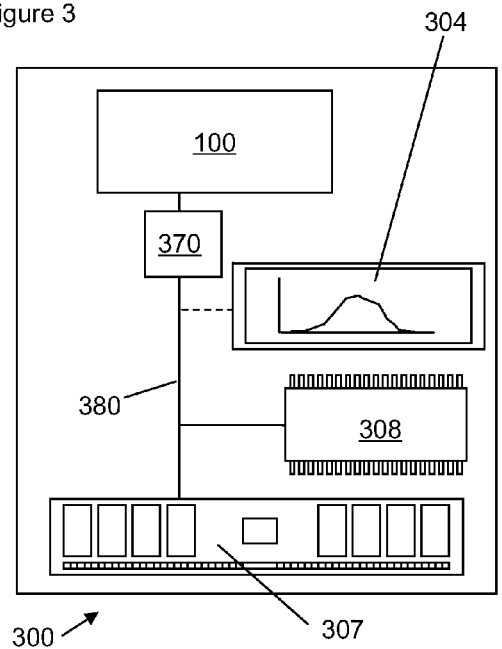
FIG. 3 illustrates an example apparatus embodiment comprising a number of electronic components, including memory and a processor, according to another embodiment of the present disclosure.

FIG. 3 depicts a further example embodiment of an electronic device 300 comprising the apparatus 100 of FIG. 1. The apparatus 100 can be provided as a module for device 300, or even as a processor/memory for the device 300 or a processor/memory for a module for such a device 300. The device 300 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the internet by the processor.

The apparatus 100 in FIG. 3 is connected (e.g. electrically and/or wirelessly) to an input/output interface 370 that receives the output from the apparatus 100 and transmits this to the device 300 via data bus 380. Interface 370 can be connected via the data bus 380 to a display 304 (touch-sensitive or otherwise) that provides information from the apparatus 100 to a user. Display 304 can be part of the device 300 or can be separate. The device 300 also comprises a processor 308 configured for general control of the apparatus 100 as well as the device 300 by providing signalling to, and receiving signalling from, other device components to manage their operation.

The storage medium 307 is configured to store computer code configured to perform, control or enable the operation of the apparatus 100. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

Figure 4A:
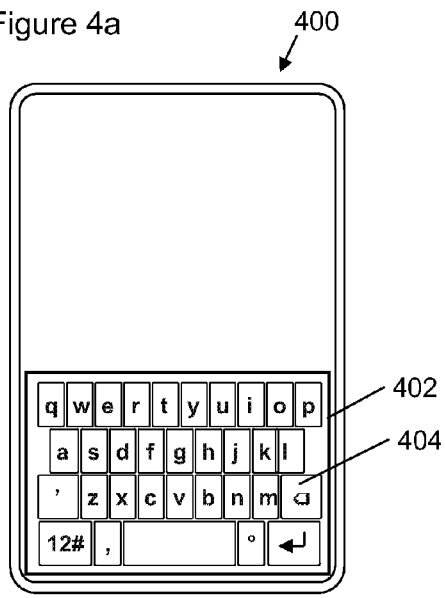
FIGS. 4a-4c illustrate portable electronic device each having physical keypad and a touch-sensitive input layer which are partially overlapping according to embodiments of the present disclosure.
Figure 4B:
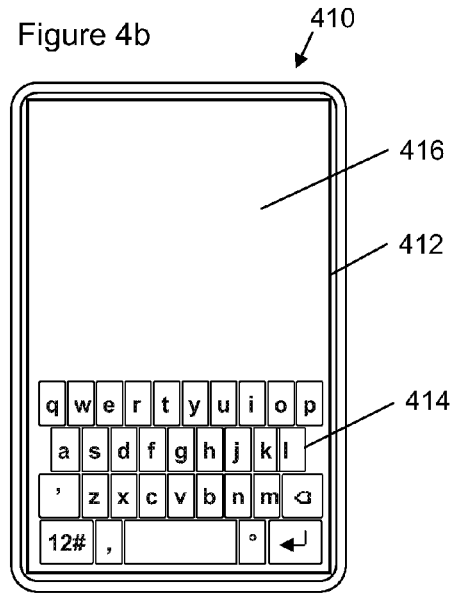
Figure 4C:
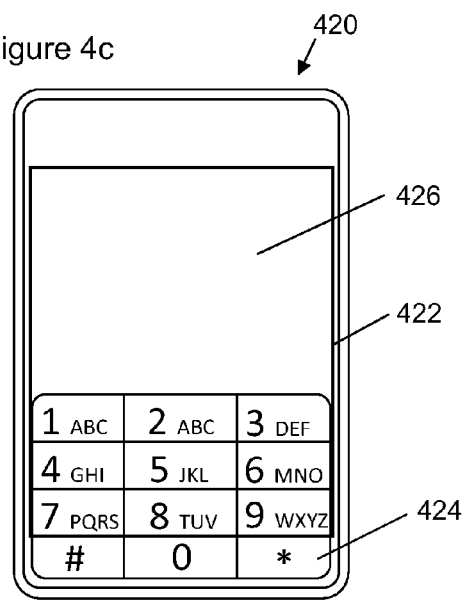

FIGS. 4a-4c illustrate example embodiments of an apparatus/device 400 comprising both physical keys in a physical key layer and a touch-sensitive input layer. The touch-sensitive input layer and the physical key layer are at least partly overlying in each case.

FIG. 4a shows an apparatus/device 400 with a physical alphanumeric keypad layer 402 and a touch-sensitive input layer 404 overlying on top of the keypad layer 402. In other examples the keypad layer 402 may overlie on top of the touch-sensitive input layer 402 and a touch may be detected by the touch-sensitive input layer, for example, when a physical key of the key layer is (e.g., fully) depressed by a finger such that the finger also contacts the touch-sensitive input layer underneath 402.

FIG. 4b shows an apparatus/device 410 with a physical alphanumeric keypad layer 414 and a touch-sensitive input layer 412 overlying on top of both the keypad layer 414 and the display screen 416 (which may be on substantially the same layer).

FIG. 4c shows an apparatus/device 420 with a physical 12-key (e.g., ITU-T) telephone keypad layer 424 and a touch-sensitive input layer 422 partially overlying on top of both the keypad layer 424 and the display screen 426.

Such devices may allow for a user input to be provided which both provides a touch user input to the touch-sensitive input layer 402, 412, 422 and presses a physical key of a keypad layer 404, 414, 424. The physical keypad layer 404, 414, 424 may be, for example, a smooth display layer overlying a series of mechanical push-buttons, a series of snap-dome buttons, or a series of discrete mechanical keys, for example. The physical key layer may comprise only one physical key in certain examples.

FIGS. 5a-5f illustrate different example combinations of actuation of a physical key of an electronic device. The actuation comprises depression and release of the key. Activation of the touch-sensitive input layer occurs at different points in the actuation of the physical key.

FIG. 5a shows that a physical key 502 has been depressed 504, and upon the depression 504 being made, the touch-sensitive input layer 506 is activated 508. The physical key 502 is then released 510. FIG. 5b shows that a physical key 502 has been depressed 504 and then released 510. Upon the key release 510, the touch-sensitive input layer 506 is activated 508.

In FIGS. 5a and 5b, for example, the user may press the physical key and provide both a physical key press and a touch user input by virtue of the touch-sensitive input layer becoming activated due to the key actuation (upon depression 504 as in FIG. 5a, or upon depression 504 and release 510 as in FIG. 5b).

FIG. 5c shows that a physical key 502 has been depressed 504, and upon the depression 504 being made, the touch-sensitive input layer 506 is activated 508. The physical key 502 is then released 510 but before moving his finger away from the touch-sensitive input layer 506, the user performs a swipe touch user input 512. FIG. 5d shows that a physical key 502 has been depressed 504 and then released 510. Upon the key release 510, the touch-sensitive input layer 506 is activated 508, but before moving his finger away from the touch-sensitive input layer 506, the user performs a swipe touch user input 512.

In FIGS. 5c and 5d, for example, the user may press the physical key to actuate the touch-sensitive input layer 506, and once the layer 506 is activated the user can provide a further touch user input (in this example a swipe user input 512) The touch-sensitive input layer 506 may be activated as shown by depression 504 of a physical key 502 as in FIG. 5a, or upon depression 504 and release 510 of a physical key 502 as in FIG. 5b).

FIG. 5e shows that a physical key 502 has been depressed 504, and upon the depression 504 being made, the touch-sensitive input layer 506 is activated 508. The user then performs a press-and-slide touch user input 512 over the physical key layer which slides over the touch-sensitive input layer 506 and presses a series of physical keys of the physical key layer. The user then releases his finger 510 over a different physical key 514 to the key 502 depressed at the start of the user interaction.

FIG. 5f shows a physical key 502 has been depressed 504 and then released 510. Upon the key release 510, the touch-sensitive input layer 506 is activated 508. The apparatus in this example is configured to switch the touch-sensitive input layer 506 into the non-detecting state if a skin or capacitive contact is not subsequently detected after a predetermined time 516 following the detection of the physical key layer user input 504, 510. In this example no skin or capacitive contact is detected by the touch-sensitive input layer 506 after a predetermined time 516. After this predetermined time 516 the touch-sensitive input layer 506 reverts back to a non-detecting state. This may provide advantages for a user by reducing unnecessary power consumption of the device. If a user accidentally actuates a physical key, for example by pressing on the physical keypad while the electronic device is in a pocket, then the touch-sensitive input layer will be activated. Since no skin/capacitive contact with the touch-sensitive input layer was made, the apparatus is configured to de-activate the touch-sensitive input layer after a predetermined time to reduce power consumption by the device.

In FIGS. 5a, 5c and 5e, the apparatus is configured to change the state of the touch-sensitive input layer 506 from a non-detecting state to a detecting state after depression 504 of a physical key 502 of the physical key layer and before release 510 of a physical key 502, 514 of the physical key layer. In FIGS. 5b, 5d and 5f, actuation of the physical key layer comprises depression 504 of a physical key 502 of the physical key layer and release 510 of a physical key 502 of the physical key layer. The apparatus is configured to change the state of the touch-sensitive input layer 506 from a non-detecting state to a detecting state 508 after depression 504 and release 510 of the physical key 502 of the physical key layer.

FIGS. 6a-6c illustrate example embodiments of an apparatus/device 600 comprising a physical key layer 604 and a touch-sensitive input layer 602. The layers 602, 604 in this example are at least partly overlying, in that the touch-sensitive input layer 604 overlies both the physical key layer 602 and a display screen 608. In FIGS. 6a-6c, initially the apparatus/device 600 is locked to user interaction, which in this example means that the device will not accept a user input other than an "unlock" user input.

In this example, the apparatus/device 600 can be moved from a locked state to an unlocked state by the provision of a user input comprising both a skin contact/capacitive contact touch user input to the touch-sensitive input layer 602 and a physical key press to the asterisk key in the bottom right of the physical keypad 604. That is, the apparatus is configured to change the state of the touch-sensitive input layer 602 from a non-detecting state to a detecting state based on detection of a user input made using a user interface of the electronic device 600. The user interface comprises the touch-sensitive input layer 602 and a physical key layer 604. Detection of the user input comprises detection of actuation using the physical key layer 604.

In FIG. 6a the apparatus/device 600 is in the user's pocket. The user has accidentally pressed 606 on the asterisk key of the physical keypad 604 by pushing on the keypad 604 while the device 600 is in his pocket. While a physical key press is detected, there is no skin or capacitive contact with the touch-sensitive input layer, since it is a layer of non-contact/non-conducting fabric (the user's pocket lining) which made contact with the touch-sensitive input layer 602. Therefore the touch-sensitive input layer 602 is activated but no touch user input is detected, so the device 600 is not unlocked. This may be advantageous since the user is unlikely to accidentally unlock the device 600 while it is in a bag or pocket. If the device 600 was accidentally unlocked then other inputs may be accidentally provided for example, to start a telephone call or launch an internet browser. This would be annoying for the user and the user may be charged for accessing services which he did not intend to access. Instead in this example, no touch user input is provided and therefore the device 600 is not unlocked. As in FIG. 5f, the touch-sensitive input layer 602 may revert to a de-activated state after a predetermined period of time to save power.

In FIG. 6b the apparatus/device 600 is resting on a desk. The user has accidentally touched/tapped (without pressing) 610 on the touch-sensitive input layer 602 overlying the asterisk key of the physical keypad 604 using his skin (his finger 610). Since there has been no physical key actuation, the touch-sensitive input layer 602 has not been activated. Thus the device 600 is not unlocked. This may be advantageous since the user is unlikely to accidentally unlock the device 600 (or provide any other touch user input) by accidentally touching the touch-sensitive input layer 602. This may be considered to provide for a more robust user interface because accidental touch user inputs alone will not unlock the device 600. Also, power is saved by the touch-sensitive input layer 602 only being activated after a physical key actuation compared with a situation where the touch-sensitive input layer is always activated. In other examples another object which would cause an input to be made to a touch-sensitive input layer 602 may have been used, such as a thumb or palm (skin) or other capacitive input device (a stylus or glove configured to provide input to active touch-sensitive input layers).

In FIG. 6c, the user has actuated the physical asterisk key of the physical key layer 604 with a finger 612. This physical key actuation activates the touch-sensitive input layer 602. The user's finger skin/capacitive contact 612 with the touch-sensitive input layer 602 after physical key actuation (either after key depression or after both key depression and release) is detected by the now-active touch-sensitive input layer 602 and the device 600 is unlocked.

FIG. 6c may be considered to show that a particular physical key layer user input (pressing the asterisk key) is associated with the performance of a particular function by the electronic device 600, namely unlocking the device 600. The apparatus is configured to enable the particular function (e.g., unlocking) of the electronic device 600 to be performed based on the subsequent detection of the particular touch user input 612 from the touch-sensitive input layer 602 when in the detecting state. By pressing on the asterisk key with a finger 612 the user necessarily also makes skin contact with the touch-sensitive input layer 602 which overlies the asterisk key. Since the touch-sensitive input layer 602 is activated after actuation of the asterisk key, power need not be supplied to the touch-sensitive input layer 602 until detection of actuation of the asterisk key. It may be said that the subsequent detection of the touch user input 612 using the touch-sensitive input layer 602 when in the detecting state enables the performance of a particular function by the electronic device 600, the particular function being changing the state of the electronic device 600 from a locked state to an unlocked state. Advantageously, the user is much less likely to accidentally unlock the device without intending to, since both a physical key press and a touch user input (which can only be detected by the touch-sensitive input layer after activation due to detection of a physical key actuation) are required to unlock the apparatus/device 600.

In other examples it need not be the asterisk key which is a particular physical key associated with enabling the particular function of unlocking the device 600. Another key may be used along with a detected touch user input 612 to cause the device 600 to unlock. The apparatus would be configured to enable the particular unlock function associated with the particular physical key to be performed if skin or capacitive contact is subsequently detected using the touch-sensitive input layer in the detecting state. In other examples, any physical key may be used rather than a particular predetermined physical key being associated with a particular function.

In other examples it need not be that a tap (i.e., non-moving) touch user input made to the touch-sensitive input layer 602 is configured to unlock the device 600. Another particular touch user input, such as a slide in a particular direction over the touch-sensitive input layer, 602 may be required for the device 600 to unlock. If the particular touch input is associated with the performance of a particular function (e.g., unlock) by the electronic device 600, the apparatus would be configured to enable the particular function of the electronic device to be performed based on the subsequent detection of the particular touch user input (e.g., slide) from the touch-sensitive input layer when in the detecting state.

In certain examples both a particular combination of physical key layer user input and touch user input may be associated with performance of a particular function. The apparatus would be configured to enable the particular function of the electronic device to be performed based on the detection of the particular combination of physical key user input and the subsequent touch user input using the touch-sensitive input layer when in the detecting state. In certain examples the user may be able to configure a particular physical key press and touch user input gesture combination to enable a particular function, such as unlocking the device 600. For example, the user may be able to press the space key and then trace a circle around it on the touch-sensitive input layer to enable a function. Another example is that a user may be able to press the "1" key and then slide to the left to enable a particular function. In relation to enabling an unlock function, it may be advantageous for a user to assign a particular key press and touch user input combination to enabling device unlock, as it may be more difficult for an unauthorised user (not knowing the key-press/touch input combination) to unlock the device 600.

Figure 7A:
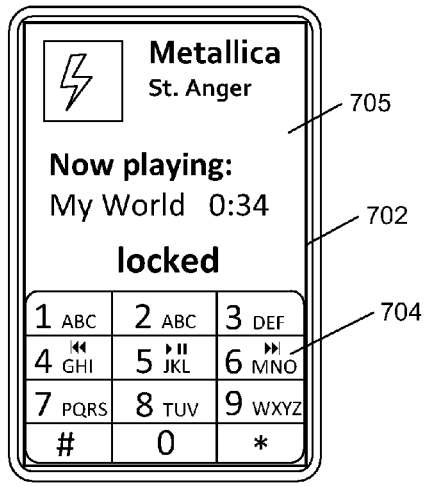
FIGS. 7a-7c illustrate providing a user input to an electronic device in the locked state according to embodiments of the present disclosure.
Figure 7B:
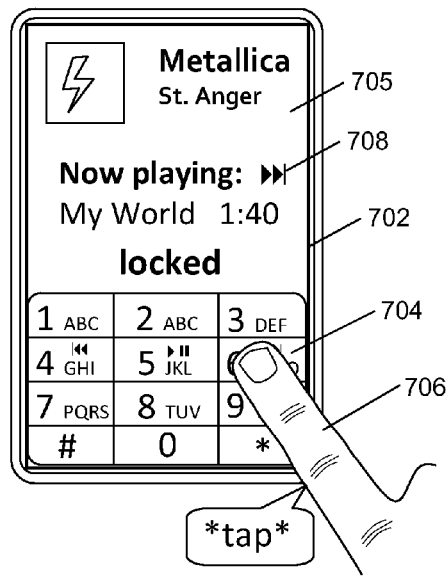

FIGS. 7a-7b illustrate an example embodiment of an apparatus/device 700 comprising a physical key layer 704 and a touch-sensitive input layer 702 in a user interface. The layers 702, 704 are at least partly overlying, in that the touch-sensitive input layer 704 overlies on top of both the physical key layer 702 and a display screen 705. The apparatus/device 700 is currently in a locked state, in that the set of locked functions available to the electronic device 700 is limited with respect to the set of unlocked functions available to the electronic device 700 in an unlocked state.

The apparatus/device 700 is currently being used as a music player, with the band name, song title and number of seconds into the currently playing song being displayed on the display screen 705. The user wishes to fast forward through the currently playing track.

As shown in FIG. 7b, the user has pressed 706 the "6-MNO-fast forward" physical key. By actuating a physical key the state of a touch-sensitive input layer 704 is changed from a non-detecting state to a detecting state. The apparatus has detected a user input by detecting the actuation of a key of the physical key layer 702. Since the touch-sensitive input layer 702 is now active, a touch user input can be detected. In this example the user touches the touch-sensitive input layer 702 over the "6-MNO-fast forward" key when the user presses the physical "6-MNO-fast forward" key. The combination of detecting a touch user input with the selection of the particular "6-MNO-fast forward" key for actuation causes the device to fast forward through the currently playing track while the device 700 is in a locked state. The fast forward input is indicated to the user by a fast forward icon 708.

Figure 7C:
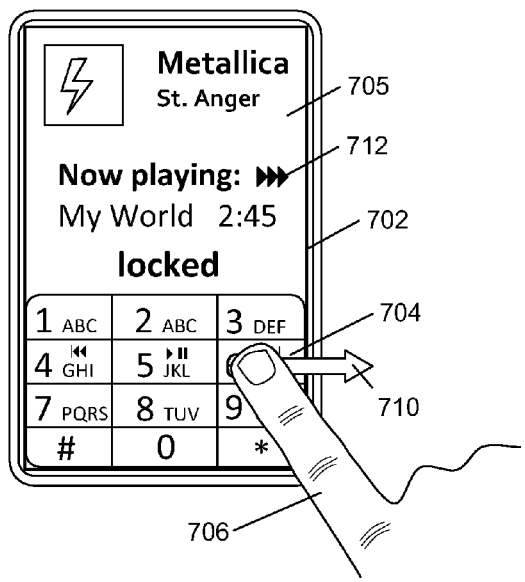

As shown in FIG. 7c, the user can provide other user inputs to perform other limited user inputs while the device 700 is in the locked state. After fast-forwarding at a particular speed by actuating the fast forward physical key and touching the touch-sensitive input layer 702, the user decides to fast forward at a quicker speed. The user is able to provide a touch user input of a slide to the right 710 using his finger 706. The slide to the right 710 is detected as an input to fast forward more quickly than the current speed. The increased speed fast forward input is indicated to the user by a fast forward icon 712.

Therefore, after actuation of a physical key (in this example a particular physical key configured to fast forward through media), the touch-sensitive input layer 702 is activated and the user can provide a touch user input to the device 700 while in a locked state. This may be considered as allowing the user to make an input via a shortcut user input, since the device 700 need not be unlocked prior to the shortcut fast forward input being made. The device advantageously remains in the locked state, thereby minimising the chance of the user providing an unintentional input, for example by leaning on the keypad. Also, since the device remains in the locked state, advantageously the user is allowed to make only limited user inputs such as key inputs corresponding to the currently active application. In this example, the user may be able to, for example, fast forward, rewind, play, pause, and skip forward and backwards through tracks, but the user may not be able to change album, change the playlist/order of play, make a phone call or send a message without first unlocking the device 700. Therefore the user may be less likely to accidentally make an unintentional input.

In the above example the user presses a particular physical key (the "6-MNO-fast forward" key) to make the fast forward input, and the user may make different touch user inputs (touch, slide to the right) to make different types of fast forward. In other examples, the user may be able to actuate any physical key, which, when followed by a particular touch sensitive input would allow the user input to the application running on the locked device. For example, the user may be able to actuate any physical button and provide a particular touch user input to the activated touch-sensitive input layer to provide an input to the locked device. For example, the user could actuate any key located centrally on the physical key layer, and a particular user input may then be provided to the now-active touch-sensitive input layer, such as slide right to fast forward, slide left to rewind, slide up to play/pause, and slide down to skip forward one track.

In another example embodiment, after receiving a user input comprising actuation of a physical key and provision of a touch input to the touch-sensitive input layer (activated by the physical key actuation), the device/apparatus may be unlocked and the application/function associated with the shortcut key input may be performed. This may enable the user to cause a function to be performed and the device to be unlocked with a single user input/gesture. For example, pressing/actuating a keypad key "7" could unlock the device and also launch an e-mail application in an inbox view. In another example, a user may be able to press/actuate the keypad key "8" with a finger (or other conducting stylus) which would also activate the touch-sensitive input layer due to actuation of the "8" key. Then, without lifting his finger from the touch-sensitive input layer, the user may perform a swipe gesture upwards to unlock the device and also launch a maps application.

FIGS. 8a-8b illustrate an example embodiment of an apparatus/device 800 comprising a physical key layer 802 and a touch-sensitive input layer 804 in a user interface. The layers 802, 804 are at least partly overlying, in that the touch-sensitive input layer 804 overlies over the physical key layer 802. The apparatus/device 800 is currently in a locked state as in the example of FIGS. 7a-7c.

The apparatus/device 800 is currently operating in a silent mode as indicated by a displayed icon 806. For example, if a phone call or message is received by the apparatus/device 800, then no audible indicator will play. The user wishes to change the apparatus/device to operating in a non-silent mode, such that audio output is provided.

FIG. 8b shows the user has actuated a physical key by pressing it. In this example it is not important which particular physical key is actuated. By actuating a physical key the state of a touch-sensitive input layer 804 is changed from a non-detecting state to a detecting state. The apparatus has detected a user input by detecting the actuation of a key of the physical key layer 802. Since the touch-sensitive input layer 802 is now active a touch user input can be detected. In this example the user touches the touch-sensitive input layer 802 when the user presses the physical key. The combination of detecting a touch user input with the selection of a key causes the device to move from a silent mode to a non-silent mode as indicated 806, 808 on the display.

In other examples the user may actuate a particular physical key, such as the "S" key ("S" indicating Silent mode toggle on/off) to, along with a touch user input, as a shortcut to toggle between silent mode ON and silent mode OFF. In such an example, other particular keys may be configured, along with a detected touch user input, as a shortcut to toggle between different operation states. For example, actuating the "V" key may toggle vibration on and off, actuating the "C" key may toggle the camera on and off, and actuating the "W" key may toggle the wireless receiver on and off.

In other examples, the user may be able to actuate a particular physical key, along with a detected touch user input, as a shortcut to select a particular configuration of the apparatus/device. For example, a user may be able to actuate the "1" key to select SIM card 1 to be operational, and actuate the "2" key to select SIM card 2 to be operational. In certain examples the user may be able to actuate a particular physical key to set a particular operating mode. For example, actuating the "S" key may switch the apparatus/device to operate in Silent mode with no vibration, while actuating the "F" key may switch the apparatus/device to operate in Flight mode, and actuating the "V" key may switch the apparatus/device to operate in silent mode allowing Vibration alerts.

FIG. 9 illustrates an apparatus/device 900 with a physical key layer having a plurality of keys 904, a display screen 902, and a touch-sensitive input layer. The apparatus/device 900 is configured to change the state of the touch-sensitive input layer from a non-detecting state to a detecting state upon actuation of a physical key 904. The region of the touch-sensitive input layer which is changed from non-detecting to detecting may be different in different examples.

For example, the region of the touch-sensitive input layer which is activated upon actuation of a physical key 904 may be the region in the location of the detected user input. For example, if a user pressed the key shown in the bottom right, the local overlying region 910 of the touch-sensitive input layer may be activated while the remaining area remains de-activated. As another example, if a user pressed a key of the physical key layer, then the region of the touch-sensitive input layer overlying the physical key layer 908 may be activated while the remaining area located over the display screen remains de-activated. As another example, if a user pressed a physical key the entire touch-sensitive input layer 906 may be activated.

In certain examples it may be advantageous to activate a smaller region of the entire touch-sensitive input layer, for example to minimise the supply of power to regions of the touch-sensitive input layer which are unlikely to be interacted with, and to restrict the allowed touch user inputs to a particular region of the touch-sensitive input layer. In certain examples it may be advantageous to activate the entire touch-sensitive input layer, for example to allow a range of touch user inputs using any part of the touch-sensitive input layer, such as swipes, flicks, selection/indication of a displayed graphical user interface element, and/or traced shapes, for example.

It will be appreciated that the illustrated keypads are examples and that other keypads, keyboards, physical key arrays or two or more keys, and single physical keys may be present and used as disclosed herein.

In the examples described herein, the touch user input detectable by the touch-sensitive input layer when in the detecting state may comprises one or more of: a tap, a hold, a touch, a press, a slide, a flick, a circle, a shape, a multiple tap, a rub, directional input, and a hover. In the examples described herein, the apparatus may be configured to detect the user input made through the user interface of the electronic device. In the examples described herein, the apparatus may comprise the user interface, or may be the user interface, or may be the electronic device, or may be a module/circuitry for one or more of the same.

In the examples above, the touch-sensitive layer interface may instead, or in addition to, being sensitive to physical touch, comprise hover-sensing technology such that a user may provide a hover user input without the user actually/physically touching the hover/touch-sensitive layer. For example, the user's finger (or other capacitive/conducting stylus) may, after actuating a physical key to activate the hover/touch-sensitive layer, hover over the hover/touch-sensitive layer and thereby provide an input. For example, the user may first press/actuate a physical key and then perform a hover gesture in the air above or below the device which would be detected by the newly-activated hover/touch-sensitive layer.

FIG. 10a shows an example of an apparatus 1000 in communication with a remote server. FIG. 10b shows an example of an apparatus 1000 in communication with a "cloud" for cloud computing. In FIGS. 10a and 10b, apparatus 1000 (which may be apparatus 100, 200 or 300) is also in communication with a further apparatus 1002. The apparatus 1002 may be a touch-sensitive input layer and/or physical keyboard/key layer, for example. In other examples, the apparatus 1000 and further apparatus 1002 may both be comprised within a device such as a portable communications device or PDA. Communication may be via a communications unit, for example.

FIG. 10a shows the remote computing element to be a remote server 1004, with which the apparatus 1000 may be in wired or wireless communication (e.g. via the internet, Bluetooth, NFC, a USB connection, or any other suitable connection as known to one skilled in the art). In FIG. 10b, the apparatus 1000 is in communication with a remote cloud 1010 (which may, for example, be the Internet, or a system of remote computers configured for cloud computing). For example, an application such as a media player which may be interacted with by providing shortcut user inputs as described above may be stored remotely. An operating system/computer program used by an apparatus/device which may be interacted with by a user toggling and/or selecting properties as described above may be stored remotely. The control of actuation of the touch-sensitive input layer may be provided by the server 1004/cloud 1010.

FIG. 11a illustrates a method 1100 according to an example embodiment of the present disclosure. The method comprises changing the state of a touch-sensitive input layer from a non-detecting state to a detecting state based on detection of a user input made using a user interface of an electronic device, the user interface comprising the touch-sensitive input layer and a physical key layer, wherein the respective layers are at least partly overlying, and the detection of the user input comprises detection of actuation using the physical key layer.

FIG. 12 illustrates schematically a computer/processor readable medium 1200 providing a program according to an embodiment. In this example, the computer/processor readable medium is a disc such as a Digital Versatile Disc (DVD) or a compact disc (CD). In other embodiments, the computer readable medium may be any medium that has been programmed in such a way as to carry out the functionality herein described. The computer program code may be distributed between the multiple memories of the same type, or multiple memories of a different type, such as ROM, RAM, flash, hard disk, solid state, etc.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to example embodiments thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus comprising:
    at least one processor; and
    at least one memory including computer program code, the at least one memory and the computer program code configured to, with the at least one processor, cause the apparatus to perform at least the following:
    change a state of a touch-sensitive input layer from a non-detecting state to a detecting state based on detection of a user input made using a user interface of an electronic device, the user interface comprising the touch-sensitive input layer and a physical key layer wherein the touch-sensitive input layer at least partially overlaps with the physical key layer, and the detection of the user input comprises detection of actuation using the physical key layer.

2. The apparatus of claim 1, wherein the touch-sensitive input layer is configured to be responsive to skin contact or capacitive contact.

3. The apparatus of claim 2, wherein the touch-sensitive input layer is a capacitive touch-sensitive input layer.

4. The apparatus of claim 1, wherein the apparatus is configured to switch the touch-sensitive input layer into the non-detecting state if skin contact or capacitive contact is not subsequently detected after a predetermined time following the detection of the user input.

5. The apparatus of claim 1, wherein a particular physical key layer user input is associated with performance of a particular function by the electronic device and the apparatus is configured to enable the particular function of the electronic device to be performed based on subsequent detection of a particular touch user input from the touch-sensitive input layer when in the detecting state.

6. The apparatus of claim 1, wherein the detection of the user input comprises detection of actuation of a particular physical key of the physical key layer, the particular physical key associated with enabling a particular function of the electronic device to be performed, and wherein the apparatus is configured to enable the particular function associated with the particular physical key to be performed if skin contact or capacitive contact is subsequently detected using the touch-sensitive input layer in the detecting state.

7. The apparatus of claim 1, wherein a particular touch input is associated with performance of a particular function by the electronic device and the apparatus is configured to enable the particular function of the electronic device to be performed based on subsequent detection of a particular touch user input from the touch-sensitive input layer when in the detecting state.

8. The apparatus of claim 1, wherein a particular combination of physical key layer user input and touch user input are associated with performance of a particular function and the apparatus is configured to enable the particular function of the electronic device to be performed based on detection of the particular combination of physical key user input and subsequent touch user input using the touch-sensitive input layer when in the detecting state.

9. The apparatus of claim 1, wherein subsequent detection of the user input using the touch-sensitive input layer when in the detecting state enables performance of a particular function by the electronic device, the particular function being changing a state of the electronic device from a locked state to an unlocked state.

10. The apparatus of claim 1, wherein subsequent detection of skin contact or capacitive contact as the user input using the touch-sensitive input layer when in the detecting state enables performance of a particular function by the electronic device, the particular function being changing a state of the electronic device from a locked state to an unlocked state.

11. The apparatus of claim 10, wherein, in the locked state, a set of locked functions is limited with respect to a set of unlocked functions available to the electronic device in the unlocked state.

12. The apparatus of claim 1, wherein subsequent detection of the user input using the touch-sensitive input layer when in the detecting state enables the performance of a particular function by the electronic device, the particular function being one or more of:
    enabling selection of a particular network service card;
    enabling toggling through event alerts types;
    enabling toggling of properties of one or more input or output; or
    enabling provision of input commands to a media player.

13. The apparatus of claim 1, wherein the apparatus is configured to change the state of the touch-sensitive input layer from a non-detecting state to a detecting state at one or more of:
    the location of the detected user input;
    the neighbouring proximity of a location of the detected user input; or
    a region across the touch-sensitive input layer.

14. The apparatus of claim 1, wherein actuation of the physical key layer comprises depression of a physical key of the physical key layer and release of the physical key of the physical key layer, and the apparatus is configured to change the state of the touch-sensitive input layer from a non-detecting state to a detecting state after the depression and the release of the physical key of the physical key layer.

15. The apparatus of claim 1, wherein the apparatus is configured to change the state of the touch-sensitive input layer from a non-detecting state to a detecting state after depression of a physical key of the physical key layer and before release of the physical key of the physical key layer.

16. The apparatus of claim 1, wherein the user input detectable by the touch-sensitive input layer when in the detecting state comprises one or more of: a tap, a hold, a touch, a press, a slide, a flick, a circle, a shape, a multiple tap, a rub, directional input, or a hover.

17. The apparatus of claim 1, wherein the apparatus is configured to detect the user input made through the user interface of the electronic device.

18. The apparatus of claim 1, wherein the apparatus comprises the user interface, or is the user interface, or is the electronic device, or is a module/circuitry for one or more of a same.

19. A computer program product comprising a non-transitory computer readable medium comprising computer program code stored thereon, the computer program code being configured to, when run on at least one processor perform at least the following:
    change a state of a touch-sensitive input layer from a non-detecting state to a detecting state based on detection of a user input made using a user interface of an electronic device, the user interface comprising the touch-sensitive input layer and a physical key layer wherein the touch-sensitive input layer at least partially overlaps with the physical key layer, and the detection of the user input comprises detection of actuation using the physical key layer.

20. A method comprising:
    changing a state of a touch-sensitive input layer from a non-detecting state to a detecting state based on detection of a user input made using a user interface of an electronic device, the user interface comprising the touch-sensitive input layer and a physical key layer wherein the touch-sensitive input layer at least partially overlaps with the physical key layer, and the detection of the user input comprises detection of actuation using the physical key layer.

* * * * *